United States Patent
Gieseke et al.

(10) Patent No.: US 10,286,843 B2
(45) Date of Patent: May 14, 2019

(54) VEHICLE VISION SYSTEM

(71) Applicant: MAGNA ELECTRONICS INC., Auburn Hills, MI (US)

(72) Inventors: Achim Gieseke, Gross-Umstadt (DE); Michael Biemer, Aschaffenburg-Obernau (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 80 days.

(21) Appl. No.: 15/681,700

(22) Filed: Aug. 21, 2017

(65) Prior Publication Data

US 2017/0368994 A1   Dec. 28, 2017

Related U.S. Application Data

(63) Continuation of application No. 15/062,527, filed on Mar. 7, 2016, now Pat. No. 9,738,224, which is a continuation of application No. 14/272,834, filed on May 8, 2014, now Pat. No. 9,280,202.

(60) Provisional application No. 61/844,171, filed on Jul. 9, 2013, provisional application No. 61/821,922, filed on May 10, 2013.

(51) Int. Cl.
| | |
|---|---|
| *G01C 1/00* | (2006.01) |
| *B60R 3/00* | (2006.01) |
| *G01C 21/36* | (2006.01) |
| *G06F 3/00* | (2006.01) |
| *G06K 9/00* | (2006.01) |

(Continued)

(52) U.S. Cl.
CPC .............. *B60R 1/00* (2013.01); *G01C 21/365* (2013.01); *G01C 21/3679* (2013.01); *G06F 3/005* (2013.01); *G06F 3/012* (2013.01); *G06F 3/013* (2013.01); *G06F 3/017* (2013.01); *G06K 9/00845* (2013.01); *B60R 2300/105* (2013.01); *B60R 2300/205* (2013.01); *B60R 2300/802* (2013.01); *B60R 2300/806* (2013.01)

(58) Field of Classification Search
CPC . G06F 3/00; G06F 3/005; G06F 3/012; G06F 3/013; G06F 3/167; G01C 21/365; G01C 21/3679; G06K 9/00; G06K 9/00845; B60R 1/02; B60R 1/04; B60R 1/06
See application file for complete search history.

(56) References Cited

U.S. PATENT DOCUMENTS

| | | |
|---|---|---|
| 5,457,493 A | 10/1995 | Leddy et al. |
| 5,529,138 A | 6/1996 | Shaw et al. |

(Continued)

*Primary Examiner* — Yonel Beaulieu
(74) *Attorney, Agent, or Firm* — Honigman LLP

(57) ABSTRACT

A vehicular vision system includes a monitoring system operable to determine a gaze direction of a driver of the vehicle. At least one vision sensor is disposed at the vehicle and has a field of view exterior of the equipped vehicle, and at least one non-vision sensor is disposed at the vehicle and has a field of sensing exterior of the vehicle. Image data captured by the interior viewing camera, image data captured by the exterior viewing camera and sensor data sensed by the non-vision sensor are provided to a control of the vehicle. A display system includes a video screen operable to display video images for viewing by the driver of the vehicle. The video screen also displays an augmented reality overlay. Responsive at least in part to processing of captured image data and/or sensed sensor data, the vision system determines the augmented reality overlay displayed.

20 Claims, 4 Drawing Sheets

(51) Int. Cl.
  *B60R 1/00*   (2006.01)
  *G06F 3/01*   (2006.01)

(56) References Cited

U.S. PATENT DOCUMENTS

| | | | |
|---|---|---|---|
| 5,530,420 A | 6/1996 | Tsuchiya et al. | |
| 5,539,397 A | 7/1996 | Asanuma et al. | |
| 5,550,677 A | 8/1996 | Schofield et al. | |
| 5,574,443 A | 11/1996 | Hsieh | |
| 5,670,935 A | 9/1997 | Schofield et al. | |
| 5,796,094 A | 8/1998 | Schofield et al. | |
| 5,877,897 A | 3/1999 | Schofield et al. | |
| 5,949,331 A | 9/1999 | Schofield et al. | |
| 6,087,953 A | 7/2000 | DeLine et al. | |
| 6,124,886 A | 9/2000 | DeLine et al. | |
| 6,172,613 B1 | 1/2001 | DeLine et al. | |
| 6,313,454 B1 | 11/2001 | Bos et al. | |
| 6,320,176 B1 | 11/2001 | Schofield et al. | |
| 6,353,392 B1 | 3/2002 | Schofield et al. | |
| 6,396,397 B1 | 5/2002 | Bos et al. | |
| 6,477,464 B2 | 11/2002 | McCarthy et al. | |
| 6,497,503 B1 | 12/2002 | Dassanayake et al. | |
| 6,498,620 B2 * | 12/2002 | Schofield | B60N 2/002 348/118 |
| 6,678,614 B2 | 1/2004 | McCarthy et al. | |
| 6,690,268 B2 | 2/2004 | Schofield et al. | |
| 6,806,452 B2 | 10/2004 | Bos et al. | |
| 6,824,281 B2 | 11/2004 | Schofield et al. | |
| 6,946,978 B2 | 9/2005 | Schofield | |
| 6,975,775 B2 | 12/2005 | Rykowski et al. | |
| 7,004,593 B2 | 2/2006 | Weller et al. | |
| 7,004,606 B2 | 2/2006 | Schofield | |
| 7,005,974 B2 | 2/2006 | McMahon et al. | |
| 7,038,577 B2 | 5/2006 | Pawlicki et al. | |
| 7,062,300 B1 | 6/2006 | Kim | |
| 7,065,432 B2 | 6/2006 | Moisel et al. | |
| 7,123,168 B2 | 10/2006 | Schofield | |
| 7,167,796 B2 | 1/2007 | Taylor et al. | |
| 7,227,611 B2 | 6/2007 | Hull et al. | |
| 7,526,103 B2 | 4/2009 | Schofield et al. | |
| 7,639,149 B2 | 12/2009 | Katoh | |
| 7,914,187 B2 * | 3/2011 | Higgins-Luthman | B60Q 1/085 362/465 |
| 9,280,202 B2 | 3/2016 | Gieseke et al. | |
| 9,738,224 B2 | 8/2017 | Gieseke et al. | |
| 2004/0114381 A1 | 6/2004 | Salmeen et al. | |
| 2008/0088527 A1 | 4/2008 | Fujimori et al. | |
| 2010/0253597 A1 | 10/2010 | Seder et al. | |
| 2010/0253599 A1 * | 10/2010 | Szczerba | G01S 13/723 345/7 |
| 2013/0127980 A1 | 5/2013 | Haddick et al. | |
| 2013/0194426 A1 * | 8/2013 | Schofield | B60R 1/00 348/148 |
| 2014/0098008 A1 | 4/2014 | Hatton | |
| 2014/0139676 A1 | 5/2014 | Wierich | |
| 2014/0333729 A1 | 11/2014 | Pflug | |
| 2015/0022664 A1 | 1/2015 | Pflug | |
| 2015/0112586 A1 | 4/2015 | Ihara et al. | |

* cited by examiner

VEHICLE VISION SYSTEM

CROSS REFERENCE TO RELATED APPLICATIONS

The present application is a continuation of U.S. patent application Ser. No. 15/062,527, filed Mar. 7, 2016, now U.S. Pat. No. 9,738,224, which is a continuation of U.S. patent application Ser. No. 14/272,834, filed May 8, 2014, now U.S. Pat. No. 9,280,202, which claims the filing benefits of U.S. provisional applications, Ser. No. 61/844,171, filed Jul. 9, 2013, and Ser. No. 61/821,922, filed May 10, 2013, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle, and provides an augmented reality by using heads-up glasses (such as, for example, Google Glass, which are eyeglasses that provide a wearable computer or processor with a head-mounted display to display images in front of the wearer's eye or eyes) and head and eye tracking to create a transparent view through the vehicle.

The present invention is suitable for parking applications and allows the driver to look or view through a non-transparent portion of the vehicle from inside of the vehicle. Captured images (such as images derived from image data captured by one or more vehicle cameras having exterior fields of view) are displayed in a heads-up display manner, such as on the heads-up display eye glasses (such as on Google Glass or similar). Eye and head tracking for creating the view point is provided by an interior monitoring or vision system of the vehicle (such as a face and eye tracking camera or the like) and not at the glass or eyeglasses for weight purpose and ease of use of the heads-up display glasses.

The vehicle vision system includes a plurality of exterior viewing cameras at the vehicle, such as surround view cameras outside of the vehicle, which create the image that is displayed for viewing by wearer of the eyeglasses. The image provided or displayed is based on a virtual camera position that is at the location of the diver's eyes and in their direction of view (as determined by processing image data captured by the eye and head tracking camera). The image will be displayed in the heads-up transparent display of the glasses worn by the driver of the vehicle (or may be otherwise displayed or projected in the direction of the driver's gaze and into the view of the driver). Therefore, the driver can virtually look through the vehicle by simply moving his or her head and/or eyes towards a desired direction, such as towards a non-transparent portion of the vehicle, such as a side or rear panel of the vehicle or the hood and engine compartment of the vehicle or the like.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
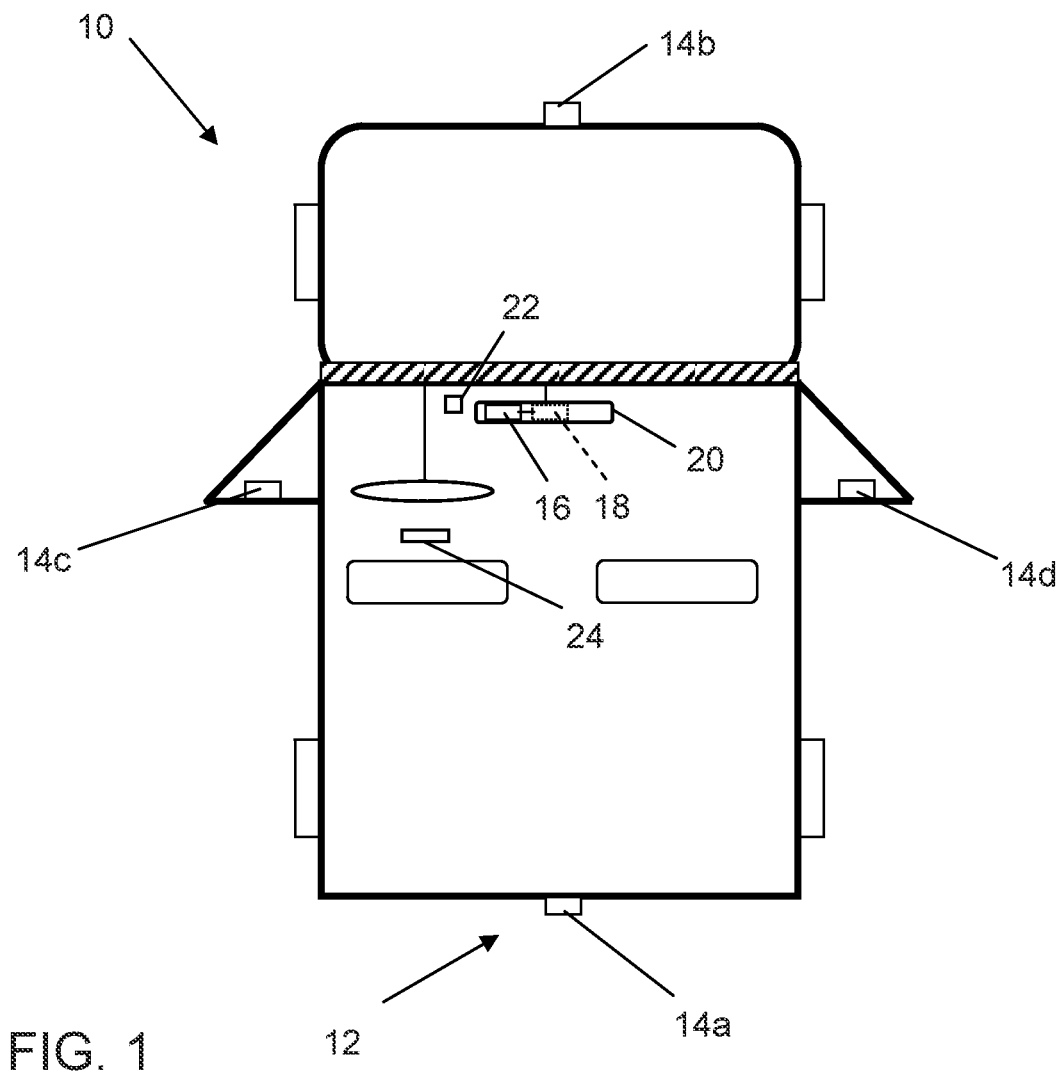
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

In the illustrated embodiment, the vision system includes an interior monitoring camera 22 having an interior field of view to capture images or image data of and track or monitor the position of the driver's head and the direction that the driver's eyes are looking (such as by using aspects of the vision systems described in U.S. Pat. No. 7,914,187, which is hereby incorporated herein by reference in its entirety). Responsive to image processing of image data captured by the interior monitoring camera, the system may determine the current driver's head and eye position/direction of view. The driver may wear heads-up display type eye glasses 24 and, responsive to the determination of the driver's view direction, the system may generate an image (based on image data captured by one or more cameras having exterior fields of view that encompass or partially encompass the driver's determined viewing direction) using the driver's eyes position as the virtual view point and may display the image at the heads-up display for viewing by the driver of the vehicle, thus providing the driver with a view exterior of the vehicle even when the driver's vision may be blocked or partially blocked in that viewing direction.

The present invention provides a display system that may replace head up displays and central displays within the vehicle by using the functions of third party image projecting pairs of glasses such as similar to the type of glasses known from Google-glasses (see, for example, http://de.wikipedia.org/wiki/Google_Glass; http://www.google.com/glass/start/). A main property of these glasses is to project images onto or into the inside of one the glass lenses or optics of the eye glasses that a wearing person is wearing and looking through.

The projection of the display image may be done by any suitable means, such as, for example:

- by use of partially transparent and partially reflective or non-light transmissive mirrors in the way of view through the glasses and projecting an image into the mirrored glasses;
- by use of a laser projection from the rear or side;
- by use of an illuminating (partially transparent) OLED or the like on or in front of the surface or embedded to the projecting lenses or mirrors; and/or
- by use of an LC-Matrix on or in front of the surface or embedded in the projecting lenses or mirrors of the glasses.

The suggested preferred embodiment of the present invention includes not just one glass projecting images, but a pair of glasses, which may (possibly or optionally) provide the viewer with a three dimensional (3D) view impression.

Optionally, the system of the present invention may support pseudo parallax projection, which basically relies on turning and shifting the virtual view according the scene's virtual viewing depths (correct parallax movement) when the driver's head is moved (as detected by a head tracker camera or the like). In such a case, just one projecting eyeglass may be sufficient.

Optionally, the eyeglasses or spectacles may detect the viewing direction of the wearing person by itself (such that the system would not need a separate eye and head monitoring camera or system in the vehicle). As another aspect of the present invention, the spectacles may have the capability to detect the focal distance of the person wearing the spectacles. This may be achieved by having two parallel infrared laser beams of harmless strength which may point to the viewer's eyes or eyes' iris center from the side, illuminating the eyeballs inner surface and the retina. By detecting the laser points distance at the eyeballs inner surface, the system may be able to determine the eye lenses refractive power (bending of fluid lens). The detection may be made by a small camera incorporated in the spectacle's structure. The Laser may also be incorporated in the eyeglasses' structure, and optionally with the LASER beams being directed by a mirror system and a micro electro mechanics (MEM) system or the like.

The preferred embodiment of the present invention includes an in cabin (preferably non spectacles) eye gaze detection device that will detect the viewing direction of the driver's eyes and its position (alternatively, just the head position or the eyeglasses' surface position may be detected and tracked). Typically, such systems employ an infrared (IR) illumination source, such as IR light emitting diodes (LEDs) and an IR camera, and track the iris circle of the eye or eyes or track the corners of the person's head and/or other specific body markers (such as, for example, the person's nose, mouth, ears, chin, eye distance (bar) and/or forehead or the like).

The system thus may be responsive, at least in part, to the driver's gaze being directed towards a non-transparent portion of the vehicle (and the system may determine when the driver's gaze is directed towards a non-transparent portion of the vehicle), and may then generate the virtual display that represents the scene exterior of the vehicle and at the other side of the presently viewed non-transparent portion of the vehicle, such as would be seen by the driver if the driver viewed through the non-transparent portion of the vehicle. Such a non-transparent portion comprises a vehicle portion that occludes or prevents the driver from seeing an exterior region exterior of that portion of the vehicle and at a blind spot area that exists due to that non-transparent portion blocking the driver's view. For example, the non-transparent portion may comprise a driver or passenger side door of the vehicle (where the displayed virtual images may be derived from image data captured by one or more sideward viewing cameras of the vehicle), the vehicle hood and engine compartment (where the displayed virtual images may be derived from image data captured by one or more forward viewing cameras of the vehicle), a rear door or panel or decklid and trunk of the vehicle (where the displayed virtual images may be derived from image data captured by one or more rearward viewing cameras of the vehicle), the A-pillars and/or B-pillars and/or C-pillars of the vehicle (where the displayed virtual images may be derived from image data captured by one or more forward viewing cameras and/or sideward viewing cameras and/or rearward viewing cameras of the vehicle) and/or the like.

The virtual image may be displayed at or by the glasses worn by the driver while the driver is operating the vehicle (whereby, when the glasses are not operating to provide the virtual display, the driver views through the lenses of the glasses). When the display of the glasses is activated, the displayed or projected virtual image provides an image representative of the exterior scene at the other side of the obstruction or non-transparent portion of the vehicle, and may provide the display as a partially transparent display so the driver can continue to view other parts of the viewed scene through the lenses of the glasses in a relatively normal manner.

Optionally, the system may be responsive to a particular driving condition, and may activate the display responsive to a parking maneuver, such as when the vehicle is in reverse or driving at a forward or reverse speed below a threshold level (such as about 5 mph or thereabouts). Optionally, the system may activate the display responsive to a user input or other triggering event, such as when the system determines that the driver is viewing in a particular direction, such as downward and forward towards the engine compartment of the vehicle (whereby the system may display status information pertaining to one or more systems or accessories of the vehicle). Optionally, the system may display exterior views during a parking maneuver and/or may display status information during forward driving speeds above a threshold level and/or may otherwise select or determine which images or information to display depending on the driving condition and/or driver's gaze.

Optionally, the glasses may provide the displaying of an overlay image. The overlay image may comprise a combination of images taken instantaneously (real time) by the exterior field of view vehicle cameras and/or other environmental sensors of the vehicle, such as, for example, RADAR sensors, LADAR sensors, LIDAR sensors, TOF sensors, structured light sensors, ultrasonic sensors and/or capacitive sensors or the like, and non real time images and overlays. Optionally, other and remote source images and image data (such as data captured by a camera or sensor remote from the vehicle and communicated to the vehicle, such as via a car2car or v2v or v2x communication system or the like) may be added or mapped in, especially non real time information.

The vehicle inherent cameras may be part of an in cabin camera system or monitoring system (typically one camera), a rear view vision system (typically one camera), a surround view vision system (typically three or four or more cameras), a side mirror camera system (replacing the side rearview mirrors by a pair of a camera and a display or image giving device at each side of the vehicle) or a forward vision driver assistant system (typically one or two cameras and/or other sensors).

The present invention vision system's eyeglasses may display images of the (real time) outside (around the vehicle) scene within the driver's view at positions at which the outside is hidden or obstructed from the driver in the current viewing direction the driver is looking at (such as by a non-transparent portion of the vehicle). By that the impression is generated that the hiding objects (such as a portion of the vehicle) are partially transparent. For example, the outside scene behind the A pillar of the vehicle may be projected in the eye glasses at the position that the A pillar actually is within the wearing person's or viewer's view (although described as being the driver of the vehicle, the wearing person or viewer may be any occupant of the vehicle, typically the driver, but could be a passenger in the passenger seat or a rear seat of the vehicle). Optionally, for example, when the viewer is viewing forwardly and downwardly towards an area immediately in front of the vehicle, the heads-up display may be provided based on images or image data captured by a front camera of a surround view vision system of the vehicle, whereby the image is displayed as if from a virtual camera at the person's eyes, with the forward part of the vehicle (such as the hood, engine compartment and/or the like) being transparent (or maybe partially transparent so the person sees a portion of the vehicle that he or she is viewing through) so that the person is effectively viewing through the vehicle to the area immediately in front of the vehicle.

The view of the outside world may have to be generated virtually for achieving a plausible view. The virtual view point (or virtual camera) should be at the viewer's eyes (or accordingly head or glasses) center. The virtual view may be generated based on outputs of the exterior vision providing cameras and optionally outputs of other sensors.

As an option to the system of the present invention, the virtual view of the outside world may be generated as an augmented reality overlay from the inside and outside vision providing cameras and optionally the sensors instead of a natural image. For example, just a black and white image, an edge sharpened image or a false color image may be provided. A preferred augmented virtual reality overlay may comprise a night vision view showing enhanced details of the outside scene during night, such as images produced from short range infrared sensors and showing high illuminated living (warm) objects produced from far range infrared sensors.

Applications for the heads up display eyeglasses may provide point of interest information overlays, maybe in form of a text banner at or overhead a location. Other applications may be envisioned for navigation. These application sources are typically not real time or at least not fully real time (having a natural time delay, such as, for example, with traffic jam- or weather forecast information or the like).

As another aspect of the present invention, the system may provide overlay data and images which stand in relation to the vehicle and driving context (the situation the vehicle is in or the driving situation). These may be fully real time or non real time. For the driving context, for example when the driver is pulling into a parking lot, the system may (start to) provide free parking space directions, or may provide transparent overlays within the parking spaces showing the subject vehicle virtually within that parking space or spaces, maybe showing the large enough ones in green and smaller ones or spaces that are too small in red or the like. As an example for vehicle context, the system may provide a virtual overlay to the viewer when he or she is looking to the direction at its engine (in reality onto the hood), which may be shown as partially transparent under the hood. If no camera will be there for capturing images of the engine itself, this overlay may be generated by rendering the vehicle's engine drawing or simplified augmentation of the drawing offline. When showing the engine, there may be real time data overlays which may show the engine's coolant temperature (by a symbolized thermometer), engine oil pressure, engine oil temperature, tire pressure, the current engine RPM and/or the oil level or remaining distance to the next oil change (such as by showing a partially filled bar), or the like. Optionally, the system may only display status information for accessories or systems that are outside of their normal operating ranges (such as when the tire pressure is low or temperature is high or when the vehicle is very close to or past its oil change mileage or the like).

Preferably, the conditions may have influence to the vehicle's virtual transparency level and to the choice of which overlays are shown in a situation, condition or context. For example, when parking the vehicle, if the driver looks towards the engine, the display may provide a display of the area in front of the vehicle and not of the engine. Also, for example, when the engine is being shown, the coolant temperature may not be shown when the temperature is within normal boundaries. During parking, the currently tuned in radio station may not be shown, for eliminating distractions to the driver. The system may detect the tiring level of the driver by any suitable driver monitoring means and may step wise reduce the amount of presented information, warnings and aids (such as images and overlays projected to the glasses) adjusted to that detected tiring level. The system may have the option for being customized by the driver (or viewers) (over a menu or by situational interaction) or by learning the driver's (or viewer's) needs and likes (in silence and/or without direct intercommunication to the driver) from the driver's behavior or habits. The learning system may utilize one unified or two Bayesian classifier or other classification models or other statistically knowledge based learning systems for achieving that.

For classifying the driver's or user's needs, the preferably invoked functions, modes or systems may comprise an input to the classification model for being offered to be invoked or being invoked automatically in similar situations, conditions or contexts in future. For classifying a behavior or habit, the rate of replication may comprise an input to the classification model.

As an additional aspect of the present invention, inputs to the classification models may also include the time of day, the season, the outside weather condition, the in cabin temperature and moisture (inside weather or climate), the number of occupants in the vehicle, the traffic situation (traffic jam, free, construction side, and/or the like), the kind of road that the vehicle is traveling on (off road, parking lot, highway, city street) and/or the like. Additionally, or alternatively, the models may employ a kind of scoring level of the stress factors appealing to the driver (or user) or scoring level of tiering. Alternatively, the models may receive the data from another system.

Other vehicle context related overlay applications may include:
  gear status
  remaining fuel
  battery status
  tire wear
  tire inflation
  oil pressure
  coolant pressure
  sportive/economic driving suggestions (as like gear change)
  suspension system mode
  light bulb defects
  blinker state
  comfort controls states.

Other driving context related overlay applications may include:
  city
  motorway
  intersection
  parking house
  car wash through driving
  overtaking
  being overtaken
  cruise controlled driving
  lane assisted driving
  traffic jam driving
  snow conditions
  icy conditions
  foggy conditions
  rain conditions
  night conditions
  off road conditions
  accident conditions
  emergency conditions
  driving beginner conditions
  high/drunk driving conditions
  elderly driving conditions
  other less definable driving conditions such as female or male driving styles.

As another option, the system of the present invention may comprise in addition to the eyeglasses and head tracking devices and its functionalities, a gesture detection system as well. That system may come separate from or may be incorporated in the head tracking system. The system may be (also) based on infrared, or it may be based on structured light, time of flight, stereo vision or structure from motion information or the like.

To use gesture recognition as a user input interface for controls and commands may be suitable for use in automotive vision. The present invention will present the visual interfaces fully virtual by the earlier specified heads up display eyeglasses or spectacles. The spectacles may show virtual control buttons, knobs, sliders and/or levers and/or the like, preferably in the area of reach of the viewer and the detection range of the gesture detection system. The viewer may grab and turn, push pull or shift or actuate the virtual buttons, knobs and levers at its virtual position in the real cabin room. Thus, the gestures don't need to be somehow vague and primitive as like in typical gesture control systems. Because the virtual reality may directly react to the virtual control commands made by the viewer's gestures a looped linkage will be given. This will give the user the ability to do some fine/delicate/dedicated inputs such as like adjusting a virtual slider of a heating control, for example in an accuracy of one of eighteen digits with one increment per about 5 mm (there may be additionally the possibility to freely scale a control when active, by that the increments could have wider space).

As another example for supporting the control of a virtual view within an eyeglasses or spectacles by gesture, there may be the control of a virtual vehicle surround view camera system. For controlling a virtual, or alternatively, real camera (-view) by gesture, the driver (or user) may hold his or her hand into the air (may be at about breast height as a convenient height) such as like resting the hand on a (virtual or imaginary) ball or bowl (virtual reality systems may or may not show this bowl additionally).

Figure 2:
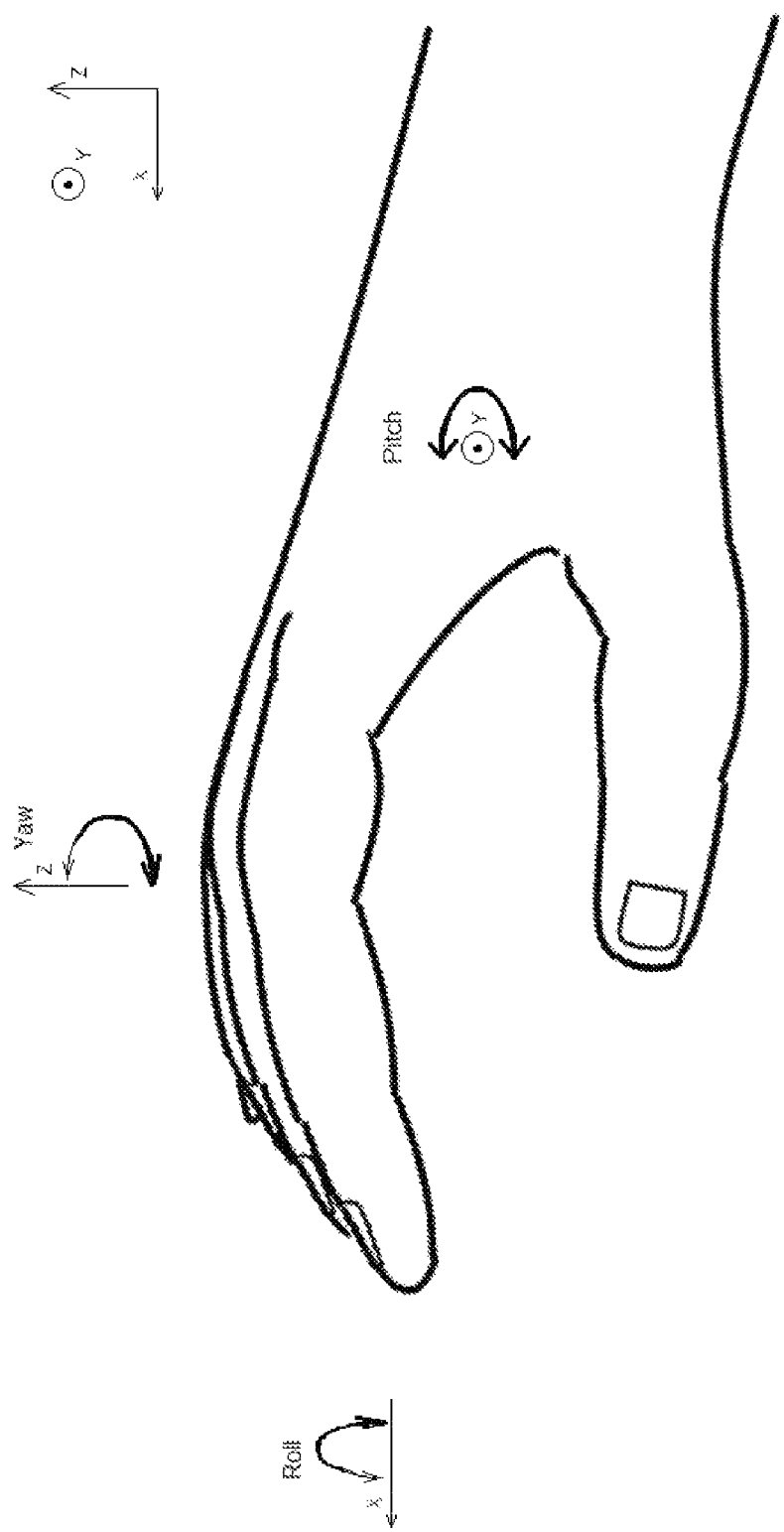
FIG. 2 is a perspective views of a person's hand and the coordinate system used by a vision system or gesture recognition system of the present invention.
Figure 3:
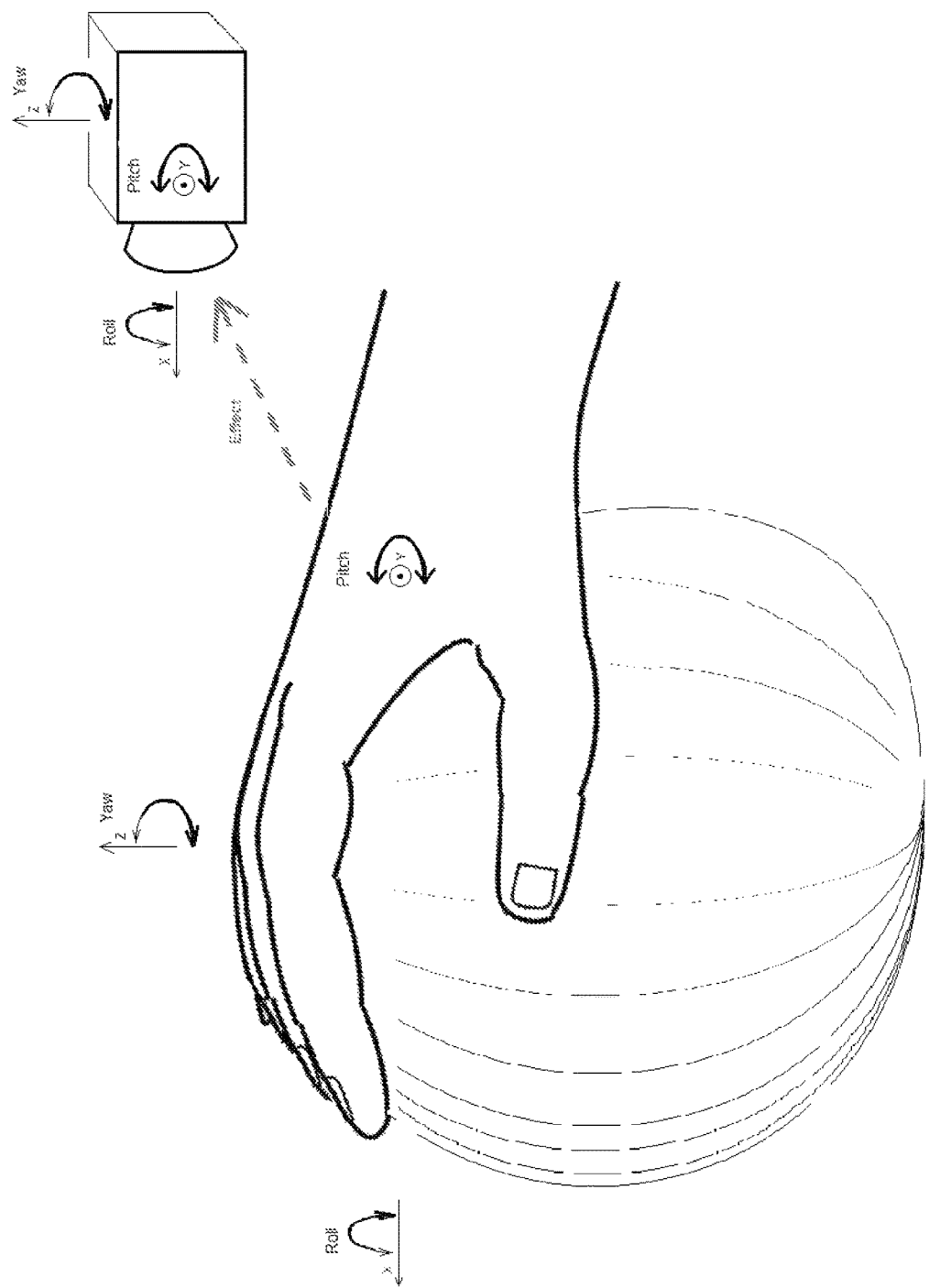
FIG. 3 is another perspective view of a person's hand, showing the hand as virtually placed at a virtual ball or sphere or bowl.
Figure 4:
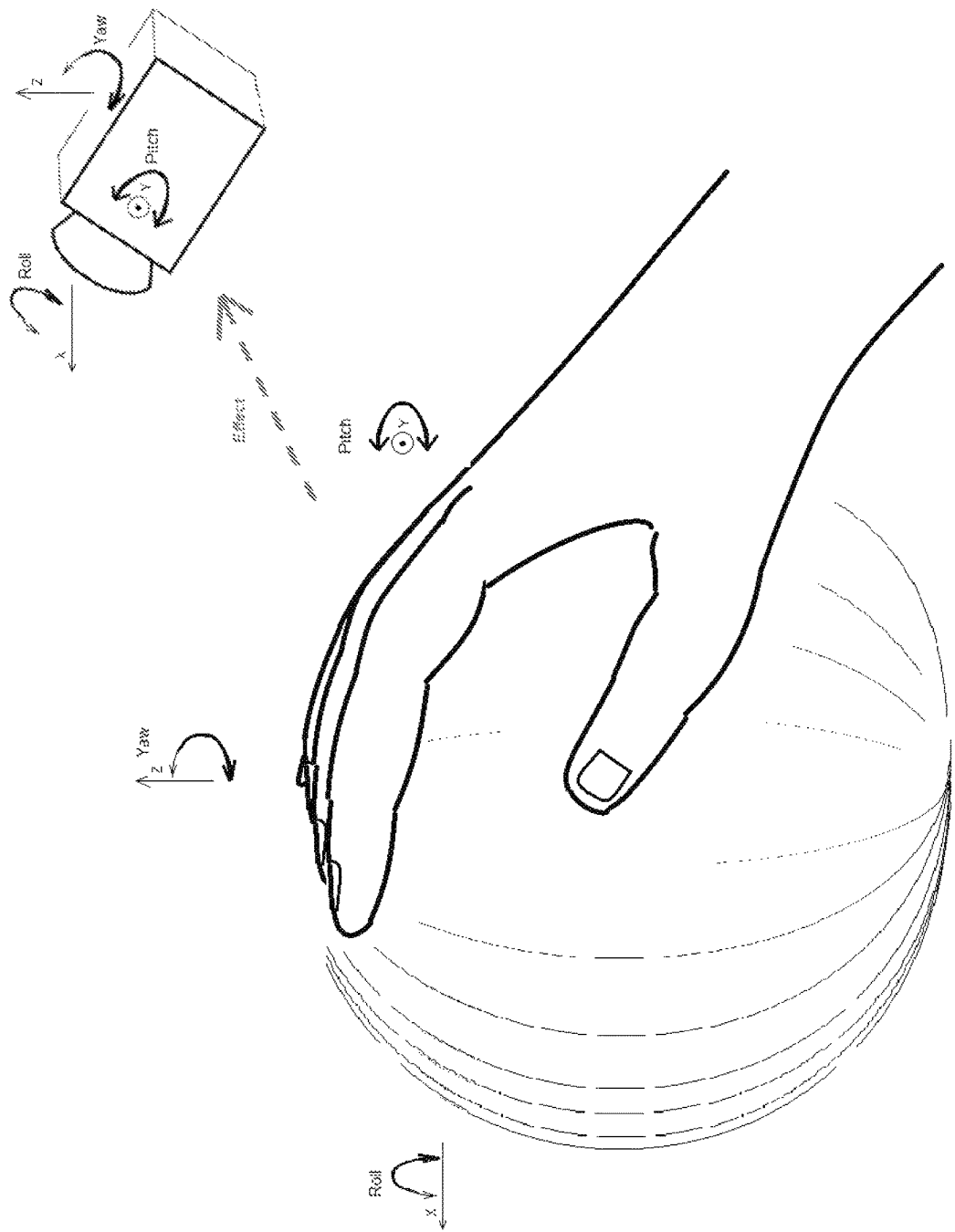
FIG. 4 is another perspective view of a person's hand, showing movement of the hand.

An example of this is shown in FIGS. 2 and 3. Responsive to a detection of (thought) gliding sidewards with the hand on the (thought) top surface of the (thought) ball or bowl, the virtual camera view may roll or adjust in an according angle and direction, or a real camera may roll or adjust as actuated by actuators. Pitching the hand (gliding forward and backward on the (thought) bowl surface) may control an according pitching of the real camera or virtual camera view (such as can be seen with reference to FIG. 4). At the time the hand does a yaw turning, the real camera or virtual camera view may change yaw. By raising and lowering the hand, the virtual view point may go up and down, by moving the hand sidewards, the virtual camera may traverse by keeping its looking angle. In practice, there may be no actuators to also raise, lower and traverse a real camera, so this function may only be available on virtual camera views.

Additionally, or alternatively, as eventually more intuitive control is provided, the driver (or user) may have the ability to grab a virtually projected vehicle (preferably projected within his or her area of reach) and turn it virtually (with his or her real world or partially or fully augmented hand). By doing that, the system, responsive to such hand gesture or movement, may change the driver's viewing direction relative to the vehicle accordingly.

Optionally, the virtual control elements may be mixed with real control elements or surfaces. Such a surface may be comprised by a *Magna* Intelligent Surface Technology (Integrated Device Molding Procedure (IDMP)) interior device as like the center arm rest (see, for example, http://wardsauto.com/suppliers/magna-intelligent-surface-technology-amplifies-hmi-connection). The real control elements may be dedicated to different virtual control functions. In practice, maybe just the control labeling will be virtually mapped, but the knob may be always the same real one, used universally. The real control elements may naturally come with the property to have a haptic feedback to the user. When using *Magna* Intelligent Surface Technology, the haptic feedback will be produced artificially (with a vibrator or unbalanced motor under the surface) as a knocking, vibrating or shaking. The feedback, such as the frequency or the like, may be in accordance to the driver's inputs.

As another optional feature, real controls may act like they are actuated by a driver or user but actually may be actuated by a virtual body or avatar. As an example, the avatar may explain or introduce the driver to complex functions and interfaces of his or her (eventually newly bought) vehicle or as a kind of "help" record, which may be played on request or spontaneous at the time the system senses the driver or user has problems with user interfaces and/or functions (this option may be separate or may be comprised as a part of above mentioned classification models of user "needs"). In there, a human like avatar may virtually grab a real knob and turn it by his/her/its virtual hand. In reality, the knob will turn actuated by an inherent (invisibly covered) actuator in a timely corresponding fashion as the avatar's hand turns.

As another option, the virtual controls may have a virtual nature which isn't doable in reality. For example, a controls menu may be projected as a flying cube for which the menu pages may change by turning that cube. This may be called a control object. A real cube has just six surfaces which would limit the menu to six pages, but the virtual cube may change its surfaces content at the surfaces which face away from the viewer. By that such a menu would have possibly an infinite number of pages. According to the above, the turning of the cube may be done by grabbing it (or grabbing at the space where it is virtually depicted) by one hand and turning it. Of course, virtual control objects will not have haptic properties when being manipulated by hand gestures.

Optionally, a glove for haptic feedback may find use to give haptic feedback to virtual control elements or virtual control objects or other virtual objects. The glove may provide a haptic feedback to the user when the user's hand (in the glove) is at the location at which the virtual control element is "located", such as by providing pressure at areas of the user's hand that grasp at the virtual control element.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent application Ser. No. 14/248,602, filed Apr. 9, 2014 and published Oct. 16, 2014 as U.S. Publication No. US-2014/0309884; Ser. No. 14/242,038, filed Apr. 1, 2014 and published Aug. 14, 2014 as U.S. Publication No. US-2014/0226012; Ser. No. 14/229,061, filed Mar. 28, 2014 and published Oct. 2, 2014 as U.S. Publication No. US-2014/0293042; Ser. No. 14/343,937, filed Mar. 10, 2014 and published Aug. 21, 2014 as U.S. Publication No. US-2014-0232872; Ser. No. 14/343,936, filed Mar. 10, 2014 and published Aug. 7, 2014 as U.S. Publication No. US-2014/0218535; Ser. No. 14/195,135, filed Mar. 3, 2014 and published Sep. 4, 2014 as U.S. Publication No. US-2014/0247354; Ser. No. 14/195,136, filed Mar. 3, 2014 and published Sep. 4, 2014 as U.S. Publication No. US-2014/0247355; Ser. No. 14/191,512, filed Feb. 27, 2014 and published Sep. 4, 2014 as U.S. Publication No. US-2014/0247352; Ser. No. 14/183,613, filed Feb. 19, 2014 and published Aug. 21, 2014 as U.S. Publication No. US-2014/

0232869; Ser. No. 14/169,329, filed Jan. 31, 2014 and published Aug. 7, 2014 as U.S. Publication No. US-2014/0218529; Ser. No. 14/169,328, filed Jan. 31, 2014, now U.S. Pat. No. 9,092,986; Ser. No. 14/163,325, filed Jan. 24, 2014 and published Jul. 31, 2014 as U.S. Publication No. US-2014/0211009; Ser. No. 14/159,772, filed Jan. 21, 2014, now U.S. Pat. No. 9,068,390; Ser. No. 14/107,624, filed Dec. 16, 2013, now U.S. Pat. No. 9,140,789; Ser. No. 14/102,981, filed Dec. 11, 2013 and published Jun. 12, 2014 as U.S. Publication No. US-2014/0160276; Ser. No. 14/102,980, filed Dec. 11, 2013 and published Jun. 19, 2014 as U.S. Publication No. US-2014/0168437; Ser. No. 14/098,817, filed Dec. 6, 2013 and published Jun. 19, 2014 as U.S. Publication No. US-2014/0168415; Ser. No. 14/097,581, filed Dec. 5, 2013 and published Jun. 12, 2014 as U.S. Publication No. US-2014/0160291; Ser. No. 14/093,981, filed Dec. 2, 2013, now U.S. Pat. No. 8,917,169; Ser. No. 14/093,980, filed Dec. 2, 2013 and published Jun. 5, 2014 as U.S. Publication No. US-2014/0152825; Ser. No. 14/082,573, filed Nov. 18, 2013 and published May 22, 2014 as U.S. Publication No. US-2014/0139676; Ser. No. 14/082,574, filed Nov. 18, 2013 and published May 22, 2014 as U.S. Publication No. US-2014/0138140; Ser. No. 14/082,575, filed Nov. 18, 2013, now U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,962; Ser. No. 14/052,945, filed Oct. 14, 2013 and published Apr. 17, 2014 as U.S. Publication No. US 2014/0104426; Ser. No. 14/046,174, filed Oct. 4, 2013 and published Apr. 10, 2014 as U.S. Publication No. US 2014/0098229; Ser. No. 14/036,723, filed Sep. 25, 2013 and published Mar. 27, 2014 as U.S. Publication No. US 2014/0085472; Ser. No. 14/016,790, filed Sep. 3, 2013 and published Mar. 6, 2014 as U.S. Publication No. US-2014/0067206; Ser. No. 14/001,272, filed Aug. 23, 2013, now U.S. Pat. No. 9,233,641; Ser. No. 13/970,868, filed Aug. 20, 2013 and published Feb. 20, 2014 as U.S. Publication No. US-2014/0049646; Ser. No. 13/964,134, filed Aug. 12, 2013 and published Feb. 20, 2014 as U.S. Publication No. US-2014/0052340; Ser. No. 13/942,758, filed Jul. 16, 2013 and published Jan. 23, 2014 as U.S. Publication No. 2014/0025240; Ser. No. 13/942,753, filed Jul. 16, 2013 and published Jan. 30, 2014 as U.S. Publication No. 2014/0028852; Ser. No. 13/927,680, filed Jun. 26, 2013 and published Jan. 2, 2014 as U.S. Publication No. 2014/0005907; Ser. No. 13/916,051, filed Jun. 12, 2013 and published Dec. 26, 2013 as U.S. Publication No. 2013/0344736; Ser. No. 13/894,870, filed May 15, 2013 and published Nov. 28, 2013 as U.S. Publication No. 2013/0314503; Ser. No. 13/887,724, filed May 6, 2013 and published Nov. 14, 2013 as U.S. Publication No. 2013/0298866; Ser. No. 13/852,190, filed Mar. 28, 2013 and published Aug. 29, 2013 as U.S. Publication No. US-2013/022593; Ser. No. 13/851,378, filed Mar. 27, 2013 and published Nov. 14, 2013 as U.S. Publication No. 2013/0300869; Ser. No. 13/848,796, filed Mar. 22, 2012 and published Oct. 24, 2013 as U.S. Publication No. 2013/0278769; Ser. No. 13/847,815, filed Mar. 20, 2013 and published Oct. 31, 2013 as U.S. Publication No. 2013/0286193; Ser. No. 13/800,697, filed Mar. 13, 2013 and published Oct. 3, 2013 as U.S. Publication No. 2013/0258077; Ser. No. 13/785,099, filed Mar. 5, 2013 and published Sep. 19, 2013 as U.S. Publication No. 2013/0242099; Ser. No. 13/779,881, filed Feb. 28, 2013 and published Sep. 5, 2013 as U.S. Publication No. 2013/0231825; Ser. No. 13/774,317, filed Feb. 22, 2013 and published Aug. 29, 2013 as U.S. Publication No. 2013/0222592; Ser. No. 13/774,315, filed Feb. 22, 2013 and published Aug. 22, 2013 as U.S. Publication No. 2013/0215271; Ser. No. 13/681,963, filed Nov. 20, 2012 and published Jun. 6, 2013 as U.S. Publication No. 2013/0141578; Ser. No. 13/660,306, filed Oct. 25, 2012 and published May 9, 2013 as U.S. Publication No. 2013/0116859; Ser. No. 13/653,577, filed Oct. 17, 2012 and published Apr. 25, 2013 as U.S. Publication No. 2013/0099908; and/or Ser. No. 13/534,657, filed Jun. 27, 2012 and published Jan. 3, 2013 as U.S. Publication No. 2013/0002873, and/or U.S. provisional applications, Ser. No. 61/977,941, filed Apr. 10, 2014; Ser. No. 61/977,940. filed Apr. 10, 2014; Ser. No. 61/977,929, filed Apr. 10, 2014; Ser. No. 61/977,928, filed Apr. 10,2014; Ser. No. 61/973,922, filed Apr. 2, 2014; Ser. No. 61/972,708, filed Mar. 31, 2014; Ser. No. 61/972,707, filed Mar. 31, 2014; Ser. No. 61/969,474, filed Mar. 24, 2014; Ser. No. 61/955,831, filed Mar. 20, 2014; Ser. No. 61/952,335, filed Mar. 13, 2014; Ser. No. 61/952,334, filed Mar. 13, 2014; Ser. No. 61/950,261, filed Mar. 10, 2014; Ser. No. 61/950,261, filed Mar. 10, 2014; Ser. No. 61/947,638, filed Mar. 4, 2014; Ser. No. 61/947,053, filed Mar. 3, 2014; Ser. No. 61/942,568, filed Feb. 19, 2014; Ser. No. 61/935,485, filed Feb. 4, 2014; Ser. No. 61/935,057, filed Feb. 3, 2014; Ser. No. 61/935,056, filed Feb. 3, 2014; Ser. No. 61/935,055, filed Feb. 3, 2014; Ser. 61/931,811, filed Jan. 27, 2014; Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/816,956, filed Apr. 29, 2013; Ser. No. 61/815,044, filed Apr. 23, 2013; Ser. No. 61/814,533, filed Apr. 22, 2013; and/or Ser. No. 61/813,361, filed Apr. 18, 2013, which are all hereby incorporated herein by reference in their entireties. The system may communicate with other communication systems via any suitable means, such as by utilizing aspects of the systems described in International Publication Nos. WO/2010/144900; WO 2013/043661 and/ or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication No. US 2010-0020170, and/or U.S. patent application Ser. No. 13/534,657, filed Jun. 27, 2012 and published Jan. 3, 2013 as U.S. Publication No. 2013/0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. patent application Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149, and/or U.S. Publication No. US-2006-0061008 and/or U.S. patent application Ser. No. 12/578,732, filed Oct. 14, 2009 and published Apr. 22, 2010 as U.S. Publication No. 2010/0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/

019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, said vision system comprising:
a monitoring system operable to determine a gaze direction of a driver of a vehicle equipped with said vision system;
wherein said monitoring system comprises an interior viewing camera disposed in an interior cabin of the equipped vehicle and having a field of view interior of the equipped vehicle that encompasses the head of the driver of the equipped vehicle;
wherein, responsive to processing of image data captured by said interior viewing camera, said monitoring system determines a gaze direction of the driver of the equipped vehicle;
at least one vision sensor disposed at the equipped vehicle, said at least one vision sensor comprising an exterior viewing camera having a field of view exterior of the equipped vehicle;
wherein said exterior viewing camera captures image data within its field of view;
at least one non-vision sensor disposed at the equipped vehicle and having a field of sensing exterior of the equipped vehicle;
wherein said non-vision sensor senses sensor data within its field of sensing;
wherein said non-vision sensor is selected from the group consisting of (i) a radar sensor, (ii) a lidar sensor and (iii) an ultrasonic sensor;
wherein image data captured by said interior viewing camera, image data captured by said exterior viewing camera and sensor data sensed by said non-vision sensor are provided to a control of the equipped vehicle;
wherein said control comprises circuitry, said circuitry comprising at least one processor operable to process data;
a display system of the equipped vehicle, said display system comprising a video display screen operable to display video images for viewing by the driver of the equipped vehicle;
wherein, responsive at least in part to processing by at least one processor of said control of image data captured by said exterior viewing camera, video images are displayed by said video display screen;
wherein said video screen also displays an augmented reality overlay; and
wherein, responsive at least in part to processing by at least one processor of said control of at least one of (a) image data captured by said exterior viewing camera and (b) sensor data sensed by said non-vision sensor, said vision system determines the augmented reality overlay displayed.

2. The vision system of claim 1, wherein the displayed video images are dependent on the determined gaze direction of the driver of the equipped vehicle.

3. The vision system of claim 2, wherein the displayed augmented reality overlay is dependent on the determined gaze direction of the driver of the equipped vehicle.

4. The vision system of claim 1, wherein the displayed augmented reality overlay pertains to at least one accessory of the equipped vehicle.

5. The vision system of claim 4, wherein the displayed augmented reality overlay is responsive at least in part to the determined gaze direction of the driver of the equipped vehicle.

6. The vision system of claim 5, wherein the augmented reality overlay displayed is responsive at least in part to a driving condition of the equipped vehicle.

7. The vision system of claim 6, wherein the driving condition comprises a parking maneuver of the equipped vehicle.

8. The vision system of claim 6, wherein the driving condition comprises a forward driving condition of the equipped vehicle.

9. The vision system of claim 8, wherein, during the forward driving condition, and responsive to determination that the driver's gaze direction is towards the engine compartment of the equipped vehicle, the augmented reality display comprises information pertaining to at least one of (i) engine operating RPM, (ii) oil pressure, (iii) oil level, (iv) coolant temperature and (v) tire pressure.

10. The vision system of claim 1, further comprising a gesture control system operable to determine a gesture of the driver, and wherein said vision system displays video images at said video display screen responsive to the determined gesture.

11. The vision system of claim 1, further comprising a gesture control system operable to determine a gesture of the driver, and wherein said control controls at least one accessory of the equipped vehicle responsive to the determined gesture.

12. The vision system of claim 1, further comprising a gesture control system operable to determine a gesture of the driver, and wherein at least one of (i) pitch of said exterior viewing camera is controlled responsive to the determined gesture, (ii) roll of said exterior viewing camera is controlled responsive to the determined gesture and (iii) yaw of said exterior viewing camera is controlled responsive to the determined gesture.

13. The vision system of claim 1, wherein said non-vision sensor comprises a radar sensor, and wherein said radar sensor senses radar data within its field of sensing.

14. A vehicular vision system, said vision system comprising:
 a monitoring system operable to determine a gaze direction of a driver of a vehicle equipped with said vision system;
 wherein said monitoring system comprises an interior viewing camera disposed in an interior cabin of the equipped vehicle and having a field of view interior of the equipped vehicle that encompasses the head of the driver of the equipped vehicle;
 wherein, responsive to processing of image data captured by said interior viewing camera, said monitoring system determines a gaze direction of the driver of the equipped vehicle;
 at least one vision sensor disposed at the equipped vehicle, said at least one vision sensor comprising an exterior viewing camera having a field of view exterior of the equipped vehicle;
 wherein said exterior viewing camera captures image data within its field of view;
 at least one non-vision sensor disposed at the equipped vehicle and having a field of sensing exterior of the equipped vehicle;
 wherein said non-vision sensor senses sensor data within its field of sensing;
 wherein said non-vision sensor comprises one of (i) a radar sensor and (ii) a lidar sensor;
 wherein image data captured by said interior viewing camera, image data captured by said exterior viewing camera and sensor data sensed by said non-vision sensor are provided to a control of the equipped vehicle;
 wherein said control comprises circuitry, said circuitry comprising at least one processor operable to process data;
 a display system of the equipped vehicle, said display system comprising a video display screen operable to display video images for viewing by the driver of the equipped vehicle;
 wherein, responsive at least in part to processing by at least one processor of said control of image data captured by said exterior viewing camera, video images are displayed by said video display screen;
 wherein said video screen also displays an augmented reality overlay;
 wherein, responsive at least in part to processing by at least one processor of said control of at least one of (a) image data captured by said exterior viewing camera and (b) sensor data sensed by said non-vision sensor, said vision system determines the augmented reality overlay displayed; and
 wherein the displayed augmented reality overlay is responsive at least in part to the determined gaze direction of the driver of the equipped vehicle and to a driving condition of the equipped vehicle.

15. The vision system of claim 14, further comprising a gesture control system operable to determine a gesture of the driver.

16. The vision system of claim 15, wherein said gesture control system controls at least one accessory of the equipped vehicle responsive to the determined gesture.

17. The vision system of claim 16, wherein said gesture control system is operable to determine movement of the driver's hand, and wherein, responsive to the determined movement, a vehicle accessory is controlled.

18. A vehicular vision system, said vision system comprising:
 a monitoring system operable to determine a gaze direction of a driver of a vehicle equipped with said vision system;
 wherein said monitoring system comprises an interior viewing camera disposed in an interior cabin of the equipped vehicle and having a field of view interior of the equipped vehicle that encompasses the head of the driver of the equipped vehicle;
 wherein, responsive to processing of image data captured by said interior viewing camera, said monitoring system determines a gaze direction of the driver of the equipped vehicle;
 at least one vision sensor disposed at the equipped vehicle, said at least one vision sensor comprising an exterior viewing camera having a field of view exterior of the equipped vehicle;
 wherein said exterior viewing camera captures image data within its field of view;
 at least one non-vision sensor disposed at the equipped vehicle and having a field of sensing exterior of the equipped vehicle;
 wherein said non-vision sensor senses sensor data within its field of sensing;
 wherein said non-vision sensor comprises one of (i) a radar sensor and (ii) a lidar sensor;
 wherein image data captured by said interior viewing camera, image data captured by said exterior viewing camera and sensor data sensed by said non-vision sensor are provided to a control of the equipped vehicle;
 wherein said control comprises circuitry, said circuitry comprising at least one processor operable to process data;
 a display system of the equipped vehicle, said display system comprising a video display screen operable to display video images for viewing by the driver of the equipped vehicle;
 wherein, responsive at least in part to processing by at least one processor of said control of image data captured by said exterior viewing camera, video images are displayed by said video display screen;

wherein said video screen also displays an augmented reality overlay;

wherein, responsive at least in part to processing by at least one processor of said control of at least one of (a) image data captured by said exterior viewing camera and (b) sensor data sensed by said non-vision sensor, said vision system determines the augmented reality overlay displayed; and a gesture control system operable to determine a gesture of the driver, and wherein at least one of (i) pitch of said exterior viewing camera is controlled responsive to the determined gesture, (ii) roll of said exterior viewing camera is controlled responsive to the determined gesture and (iii) yaw of said exterior viewing camera is controlled responsive to the determined gesture.

19. The vision system of claim 18, wherein said gesture control system is operable to determine movement of the driver's hand, and wherein, responsive to the determined movement, a vehicle accessory is controlled.

20. The vision system of claim 19, wherein the displayed augmented reality overlay is responsive at least in part to the determined gaze direction of the driver of the equipped vehicle and to a driving condition of the equipped vehicle.

* * * * *